(12) United States Patent
Jang et al.

(10) Patent No.: US 9,426,805 B2
(45) Date of Patent: Aug. 23, 2016

(54) METHOD AND APPARATUS OF RECEIVING DIFFERENT TYPES OF SUBFRAMES IN MOBILE COMMUNICATION SYSTEM

(71) Applicant: Samsung Electronics Co., Ltd., Suwon-si, Gyeonggi-do (KR)

(72) Inventors: Jae Hyuk Jang, Suwon-si (KR); Kyeong In Jeong, Hwaseong-si (KR); Gert Jan Van Lieshout, Staines (GB); Soeng Hun Kim, Yongin-si (KR); Jin-Kyu Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/610,421

(22) Filed: Jan. 30, 2015

(65) Prior Publication Data

US 2015/0139068 A1 May 21, 2015

Related U.S. Application Data

(63) Continuation of application No. 13/884,185, filed as application No. PCT/KR2011/008458 on Nov. 8, 2011.

(60) Provisional application No. 61/411,115, filed on Nov. 8, 2010.

(51) Int. Cl.
  *H04W 72/04* (2009.01)
  *H04W 52/02* (2009.01)
  (Continued)

(52) U.S. Cl.
  CPC ........ *H04W 72/0446* (2013.01); *H04H 20/71* (2013.01); *H04L 12/189* (2013.01); *H04W 4/06* (2013.01); *H04W 48/00* (2013.01); *H04W 48/10* (2013.01); *H04W 52/0216* (2013.01);
  (Continued)

(58) Field of Classification Search
  None
  See application file for complete search history.

(56) References Cited

U.S. PATENT DOCUMENTS

2004/0180675 A1  9/2004  Choi et al.
2006/0268774 A1  11/2006  Kangas et al.
(Continued)

FOREIGN PATENT DOCUMENTS

CN  101577858 A  11/2009
CN  101848420 A  9/2010
(Continued)

OTHER PUBLICATIONS

Dahlman, Erik et al. 3G Evolution: LTE for Mobile Broadband. Elsevier Korea L.L.C., Translated Edition ISBN 9788972838630, Apr. 10, 2010. See section 11.7.

(Continued)

*Primary Examiner* — Jenee Williams
(74) *Attorney, Agent, or Firm* — Jefferson IP Law, LLP

(57) ABSTRACT

A method and terminal in a wireless communication system are provided. The method includes receiving system information including information associated with a sub-frame configuration of a multimedia broadcast multicast service single frequency network (MBSFN) sub-frame, receiving dedicated message including information on configuration of a transmission mode of the terminal, detecting, if the terminal is configured in a first transmission mode, a physical downlink control channel (PDCCH) in a first sub-frame of the MBSFN sub-frame, and decoding a physical downlink shared channel (PDSCH) in the first sub-frame of the MBSFN sub-frame.

12 Claims, 3 Drawing Sheets

(51) Int. Cl.

| | | |
|---|---|---|
| *H04W 76/00* | (2009.01) | |
| *H04W 72/00* | (2009.01) | |
| *H04W 48/00* | (2009.01) | |
| *H04H 20/71* | (2008.01) | |
| *H04L 12/18* | (2006.01) | |
| *H04W 88/02* | (2009.01) | |
| *H04W 4/06* | (2009.01) | |
| *H04W 48/10* | (2009.01) | |
| *H04W 76/04* | (2009.01) | |
| *H04W 72/12* | (2009.01) | |
| *H04W 88/06* | (2009.01) | |
| *H04W 88/08* | (2009.01) | |

(52) U.S. Cl.
CPC ......... *H04W72/005* (2013.01); *H04W 72/042* (2013.01); *H04W 76/002* (2013.01); *H04W 76/046* (2013.01); *H04W 88/022* (2013.01); *H04J 2211/003* (2013.01); *H04W 72/1278* (2013.01); *H04W 88/06* (2013.01); *H04W 88/08* (2013.01); *Y02B 60/50* (2013.01)

(56) References Cited

U.S. PATENT DOCUMENTS

| | | | |
|---|---|---|---|
| 2007/0086437 A1 | 4/2007 | DiFazio et al. | |
| 2009/0252077 A1 | 10/2009 | Khandekar et al. | |
| 2010/0009687 A1 | 1/2010 | Koivisto et al. | |
| 2010/0172311 A1 | 7/2010 | Agrawal et al. | |
| 2010/0189027 A1 | 7/2010 | Ishida et al. | |
| 2010/0195622 A1 | 8/2010 | Buchmayer et al. | |
| 2010/0232346 A1* | 9/2010 | Yu et al. | 370/315 |
| 2010/0232546 A1 | 9/2010 | Yu et al. | |
| 2010/0238845 A1 | 9/2010 | Love et al. | |
| 2010/0265870 A1 | 10/2010 | Cai et al. | |
| 2010/0303013 A1 | 12/2010 | Khandekar et al. | |
| 2010/0323684 A1 | 12/2010 | Cai et al. | |
| 2010/0329171 A1 | 12/2010 | Kuo et al. | |
| 2010/0330992 A1* | 12/2010 | Bhattacharjee | H04W 52/028 455/436 |
| 2011/0013574 A1 | 1/2011 | Hsu | |
| 2011/0053490 A1 | 3/2011 | Wu | |
| 2011/0081854 A1 | 4/2011 | Kuo et al. | |
| 2011/0103291 A1* | 5/2011 | Wiberg | H04B 7/15542 370/315 |
| 2011/0141987 A1* | 6/2011 | Nam et al. | 370/329 |
| 2011/0170496 A1* | 7/2011 | Fong et al. | 370/329 |
| 2011/0200137 A1 | 8/2011 | Han et al. | |
| 2011/0243056 A1 | 10/2011 | Jen | |
| 2011/0275363 A1* | 11/2011 | Kwon et al. | 455/422.1 |
| 2011/0299449 A1* | 12/2011 | Kwon | H04L 5/0023 370/312 |
| 2012/0014286 A1 | 1/2012 | Wang et al. | |
| 2012/0039292 A1* | 2/2012 | Lee et al. | 370/329 |
| 2012/0082119 A1* | 4/2012 | Chung et al. | 370/329 |
| 2012/0093051 A1 | 4/2012 | Xu | |
| 2012/0099536 A1* | 4/2012 | Lee et al. | 370/328 |
| 2012/0207084 A1* | 8/2012 | Seo | H04B 7/155 370/315 |
| 2012/0213137 A1* | 8/2012 | Jeong et al. | 370/311 |
| 2013/0044664 A1* | 2/2013 | Nory et al. | 370/311 |
| 2013/0083736 A1* | 4/2013 | Yin et al. | 370/329 |
| 2013/0121216 A1* | 5/2013 | Chen et al. | 370/280 |
| 2013/0242973 A1* | 9/2013 | Bertrand et al. | 370/350 |

FOREIGN PATENT DOCUMENTS

| | | |
|---|---|---|
| CN | 102036171 A | 4/2011 |
| WO | 2009-133444 A1 | 11/2009 |
| WO | 2010-121194 A1 | 10/2010 |
| WO | 2010-124431 A1 | 11/2010 |

OTHER PUBLICATIONS

3GPP, '3rd Generation Partnership Project; Technical Specification Group Radio Access Network; Evolved Universal Terrestrial Radio Access (E-UTRA); Physical layer procedures (Release 9).' 3GPP TS 36.213 V9.2.0, Jun. 2010. (Retrieved from the Internet on May 17, 2012: < URL: http://www.3gpp.org/ftp/Specs/html-info/36213. htm >) See section 7.

Samsung, Independent configuration of Rel-10 features, R1-105411, 3GPP, Oct. 5, 2010.

Samsung, Issues on DL RS Design for Higher Order MIMO, R1-084169, 3GPP, Nov. 4, 2008.

NEC Group, Search space design and RE mapping for the Non-interleaved R-PDCCH transmission with CRS and DMRS, R1-104534, 3GPP, Aug. 17, 2010.

LG Electronics Inc., Remaining Issues for PDSCH Starting Point Indication with Cross-Carrier Scheduling, R1-103954, 3GPP, Jun. 23, 2010.

* cited by examiner

US 9,426,805 B2

METHOD AND APPARATUS OF RECEIVING DIFFERENT TYPES OF SUBFRAMES IN MOBILE COMMUNICATION SYSTEM

CROSS-REFERENCE TO RELATED APPLICATION(S)

This is a continuation application of a prior application Ser. No. 13/884,185, filed on May 8, 2013, which claimed the benefit under 35 under 35 U.S.C. §371 of an International application filed on Nov. 8, 2011, and assigned application number PCT/KR2011/008458, which claimed the benefit of a U.S. Provisional application filed on Nov. 8, 2010, in the U.S. Patent and Trademark Office and assigned Ser. No. 61/411,115, the entire disclosures of which are hereby incorporated by reference.

BACKGROUND OF THE INVENTION

1. Field of the Invention

The present invention relates to a wireless communication system and, in particular, to an operation method and apparatus of a high version (Rel-10) terminal in case of existence of MBSFN subframe supporting unicast in the high version (Rel-10) network of Long Term Evolution (LTE) system in which terminals with different versions (Releases 8, 9, 10, etc.) coexist.

2. Description of the Related Art

With the rapid advance of the wireless communication technology, the communication systems have evolved to the 4th Generation mobile communication system represented by LTE system. In the LTE system, the data is transmitted in unit of frame having a length of 10 msec, a frame consisting of 10 subframes.

FIG. 1 is a diagram illustrating a structure of a downlink frame used in the LTE system.

In FIG. 1, the frame 101 consists of 10 subframes 103 including normal subframes 150 carrying normal data and Multimedia Broadcast multicast service Single Frequency Network (MBSFN) subframes 107. The normal and MBSFN subframes differ from each other in number of Orthogonal Frequency Division Multiplexing (OFDM) symbols, length of Cyclic Prefix (CP), and structure and number of Cell-specific Reference Signal (CRS), and the MBMS subframe is used only for the purpose of transmitting broadcast and multicast data in Rel-8 and Rel-9 systems. As the system evolves, however, the MBSFN subframe can be used for the purpose of unicast transmission to a specific terminal as well as broadcast/multicast in the LTE Rel-10 or later.

For unicast data transmission/reception, the resource allocation information indicating the resource allocated for transmission/reception is carried on the Physical Downlink Control Channel (PDCCH) and the real data is carried on the Physical Downlink Shared Channel (PDSCH). The terminal determines whether there is any resource allocation information addressed thereto on the PDCCH before attempt receiving real data.

In this case, the LTE Rel-10 terminal has to check the PDCCH carrying the resource allocation information for the MBSFN subframe in order to receive PDSCH through even the MBSFN subframe. However, if the LTE Rel-10 terminal has to check PDCCH in every MBSFN subframe, this may cause unnecessary operation depending on whether the MBSFN subframe carries terminal-specific unicast data or multicast/broadcast data.

SUMMARY

The present invention has been made in an effort to address this problem, and it is an object of the present invention to provide a method for a terminal to receive data in a situation where different type subframes exist in the wireless communication system including networks operating with different versions of LTE.

In the case that the new version (Rel-10 or later) terminal is in a new version network, the terminal receives information on whether PDSCH reception over MBSFN subframe through broadcast or unicast is supportable from the new version network and, if supportable, takes operation for interpreting PDCCH for receiving PDSCH over MBSFN subframe and, otherwise if not supportable, skips corresponding operation in MBSFN subframe.

In the proposed method, the new version terminal operating in a new version network reduces unnecessary operation for data reception when unicast data transmission is not supported in the network, depending on whether the network supports unicast data transmission in MBSFN subframe, resulting in reduction of power consumption.

DETAILED DESCRIPTION OF EXEMPLARY EMBODIMENTS

In the following, detailed description of well-known functions and structures incorporated herein may be omitted to avoid obscuring the subject matter of the present invention. Exemplary embodiments of the present invention are described with reference to the accompanying drawings in detail.

In the present invention, the description is directed to the LTE system for convenience purpose.

There are several releases of LTE and among them the legacy Rel-8 and Rel-9 do not support PDSCH reception in MBSFN subframe. Accordingly, the legacy terminal does not attempt decoding PDCCH for receiving Downlink Control Information (DCI) including PDSCH scheduling information for receiving PDSCH in MBSFN subframe.

In the Rel-10 or later system, however, it is allowed to transmit PDSCH in MBSFN subframe. In this case, unlike the legacy terminal which takes no action for MBSFN subframe because it cannot receive PDSCH in MBSFN subframe, the new terminal has to take an action for receiving PDSCH to acquire DCI including scheduling information for receiving PDSCH in MBSFN subframe. In the following description, new terminal denotes an LTE Rel-10 terminal, i.e. the terminal capable of receiving PDSCH in MBSFN subframes.

Figure 1:
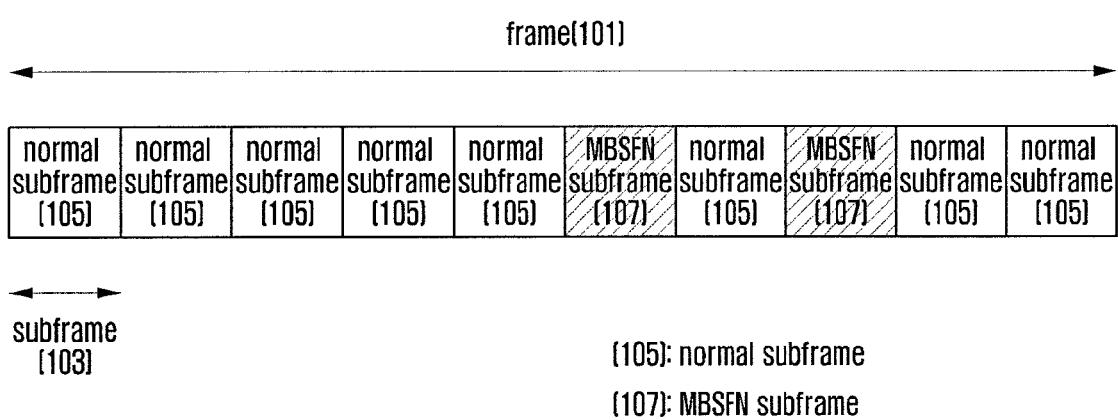
FIG. 1 is a diagram illustrating a structure of a downlink frame used in the LTE system.
Figure 2:
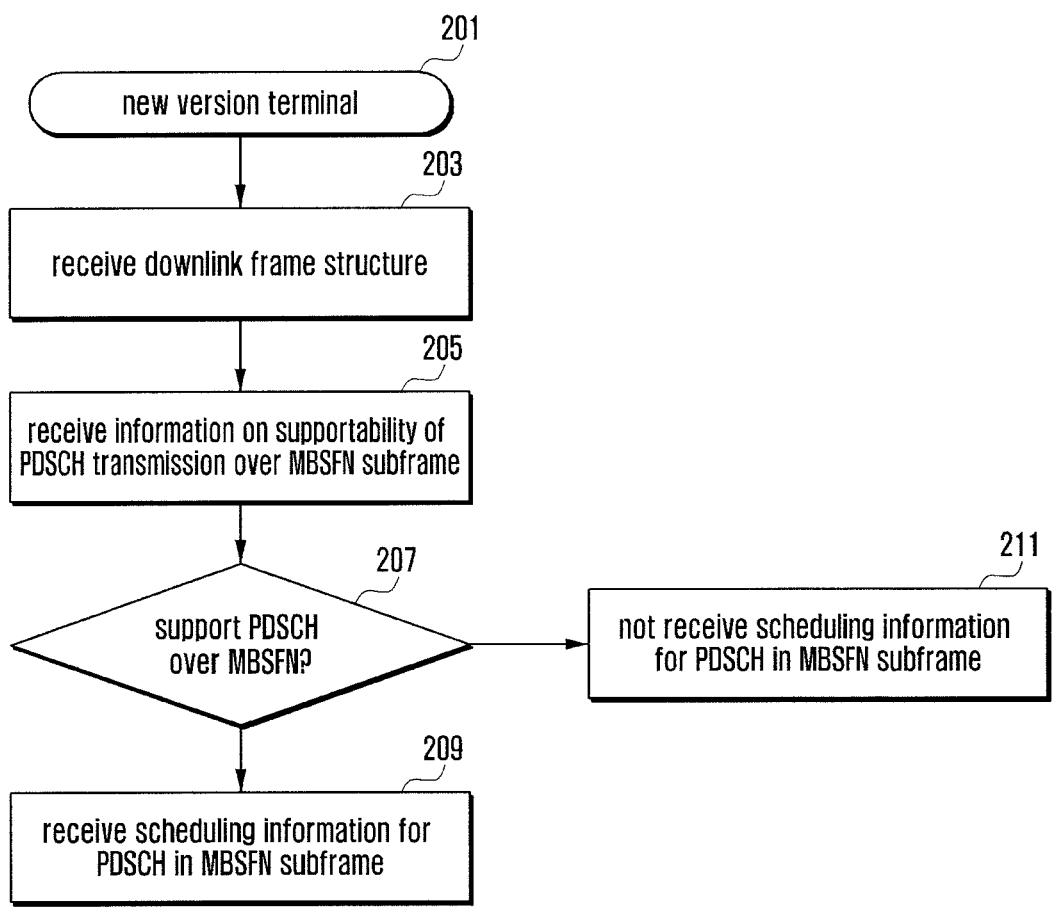
FIG. 2 is a flowchart illustrating the new terminal procedure in the method according to an embodiment of the present invention.

FIG. 2 is a flowchart illustrating the new terminal procedure in the method according to an embodiment of the present invention.

The new version terminal receives a downlink frame structure in System Information Block broadcast by a base station at step 203. The downlink frame structure is transmitted in the form of a bitmap indicating positions of MBSFN subframes.

Next, the terminal receives information on whether the base station supports PDSCH over MBSFN subframe at step 205. The PDSCH over MBSFN subframe supportability can be broadcasted in the system information of the base station or transmitted to the individual terminals through respective control messages. The PDSCH over MBSFN subframe supportability information can be transmitted in a Radio Resource Control (RRC) message explicitly with a newly defined indicator or implicitly with a legacy information (e.g. predefined channel configuration information, transmission mode information, etc.). Steps 203 and 250 can be performed in opposite order. In the case of legacy network or legacy base station, the supportability information on PDSCH over MBSFN is not transmitted. If no supportability information on PDSCH over MBSFN is received, the UE assumes that the base station does not support PDSCH of MBSFN.

If it is determined at step 207 that PDSCH over MBSFN subframe is supported, the UE receives PDCCH including DCI, at step 209, for receiving PDSCH in MBSFN subframes based on the information received at step 205.

If it is determined at step 207 that PDSCH over MBSFN subframe is not supported or if no supportability information on PDSCH over MBSFN subframe is received, the terminal takes no action for receiving PDSCH in MBSFN subframe. In this case, the terminal does not perform any operation for receiving PDSCH.

Figure 3:
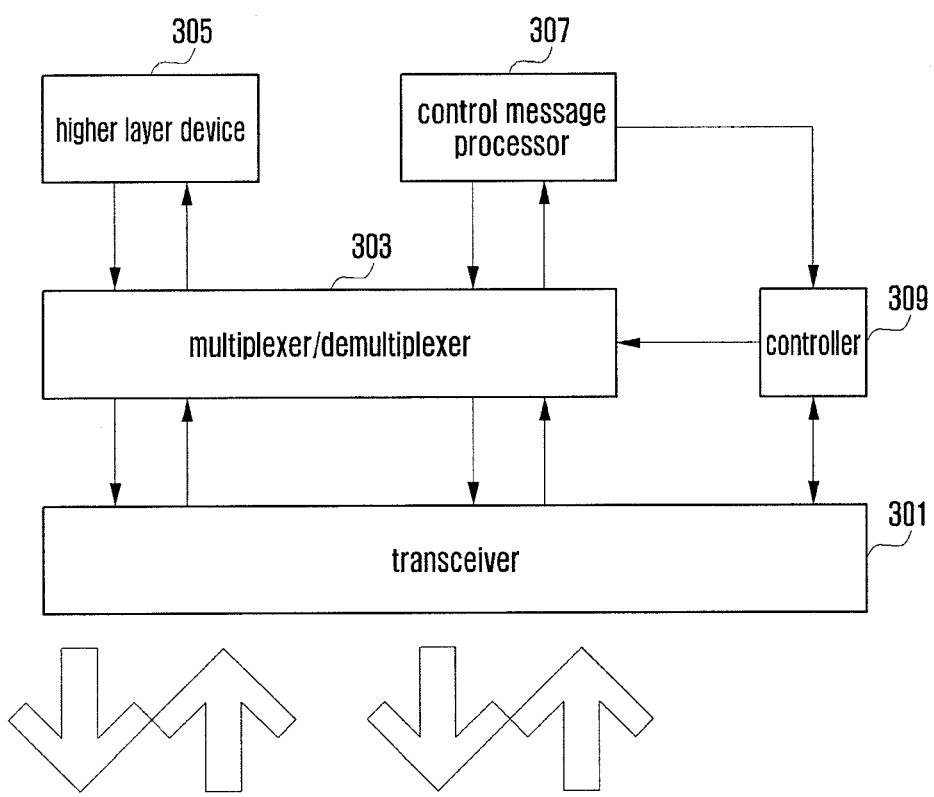
FIG. 3 is a block diagram illustrating the configuration of the terminal according to an embodiment of the present invention.

FIG. 3 is a block diagram illustrating the configuration of the terminal according to an embodiment of the present invention.

The terminal communicates data with higher layer 305 and transmits/receives control messages through a control message processor 207. The terminal multiplexes the control signals or data by means of the multiplexer/demultiplexer 303 and transmits the multiplex result by means of the transceiver 301 under the control of the controller 309. The terminal demultiplexes the physical signal received by the transceiver 301, by means of the multiplexer/demultiplexer 303, and transfers the demultiplexed signals to the higher layer 305 or control message processor 307 under the control of the controller 309.

In the present invention, the terminal receives MBSFN subframe configuration information broadcasted by the base station and receives the supportability information on PDSCH over MBSFN subframe through broadcast or unicast. Such a control message is received, the control message processor 307 transfers to the controller 309 the information on whether each subframe is normal or MBSFN subframe and whether PDSCH over MBSFN subframe is supported in order to determine whether to receive PDCCH for receiving PDSCH at every subframe. That is, if PDSCH over MBSFN subframe is supported, the terminal performs operation for receiving PDSCH even in MBSFN subframes and, otherwise PDSCH over MBSFN subframe is not supported, performs no action for receiving PDSCH in MBSFN subframes.

Although the block diagram of the terminal is directed to the case where the function blocks are responsible for different functions, the present invention is not limited thereto. For example, the controller 309 may perform the functions of the control message processor 307.

In the proposed method, the network notifies the new version terminal whether it supports PDSCH over MBSFN subframe so as to avoid unnecessary reception operation for receiving PDSCH over MBSFN subframe, resulting in reduction of power consumption.

Although exemplary embodiments of the present invention have been described in detail hereinabove with specific terminology, this is for the purpose of describing particular embodiments only and not intended to be limiting of the invention. While particular embodiments of the present invention have been illustrated and described, it would be obvious to those skilled in the art that various other changes and modifications can be made without departing from the spirit and scope of the invention.

What is claimed is:

1. A wireless communication method by a terminal in a wireless communication system, the method comprising:
    receiving, by the terminal, system information including information associated with a sub-frame configuration of a multimedia broadcast multicast service single frequency network (MBSFN) sub-frame;
    receiving, by the terminal, dedicated message including information on configuration of a transmission mode of the terminal;
    detecting, by the terminal when the terminal is configured in a first transmission mode, a physical downlink control channel (PDCCH) in a first sub-frame of the MBSFN sub-frame;
    decoding by the terminal, a physical downlink shared channel (PDSCH) in the first sub-frame of the MBSFN sub-frame; and
    skipping, by the terminal when the terminal is not configured in the first transmission mode, detection of the PDCCH in the MBSFN sub-frame.

2. The method of claim 1, wherein the dedicated message is included in a radio resource control (RRC) message.

3. The method of claim 1, further comprising:
    detecting, when the terminal is configured in a second transmission mode, the PDCCH in a second sub-frame of a non-MBSFN sub-frame; and
    decoding the PDSCH in the second sub-frame of the non-MBSFN sub-frame.

4. The method of claim 1,
    wherein the terminal supports receiving the PDSCH over the MBSFN sub-frame if the terminal is configured in the first transmission mode.

5. The method of claim 1,
    wherein the first transmission mode supports Release-10 (Rel-10), and
    wherein the Rel-10 allows to transmit the PDSCH in the MBSFN sub-fame.

6. The method of claim 1, wherein the first transmission mode is a mode wherein PDSCH over MBSFN subframe is supported and the second transmission mode is a mode wherein PDSCH over MBSFN subframe is not supported.

7. A terminal for decoding a sub-frame in a wireless communication system, the terminal comprising:
    a transceiver configured to transmit and receive signals; and
    a controller configured to control the terminal to:
        receive, via the transceiver, system information including information associated with a sub-frame configuration of a multimedia broadcast multicast service single frequency network (MBSFN) sub-frame,
        receive, via the transceiver, dedicated message including information on configuration of a transmission mode of the terminal, detect, when the terminal is configured in a first transmission mode, a physical downlink control channel (PDCCH) in a first sub-frame of the MBSFN sub-frame, decode a physical downlink shared channel (PDSCH) in the first sub-frame of the MBSFN sub-frame, skip, when the terminal is not configured in the first transmission mode, detection of the PDCCH in the MBSFN sub-frame.

8. The terminal of claim 7, wherein the dedicated message is included in a radio resource control (RRC) message.

9. The terminal of claim 7, wherein the controller is further configured to control to:

detect, when the terminal is configured in a second transmission mode, the PDCCH in a second sub-frame of a non-MBSFN sub-frame, and decode the PDSCH in the second sub-frame of the non-MBSFN sub-frame.

10. The terminal of claim 7, wherein the terminal supports receiving the PDSCH over the MBSFN sub-frame, if the terminal is configured in the first transmission mode.

11. The terminal of claim 7, wherein the first transmission mode supports Release-10 (Rel-10), and wherein the Rel-10 allows to transmit the PDSCH in the MBSFN sub-fame.

12. The terminal of claim 7, wherein the first transmission mode is a mode wherein PDSCH over MBSFN subframe is supported and the second transmission mode is a mode wherein PDSCH over MBSFN subframe is not supported.

* * * * *